United States Patent
Wang et al.

(10) Patent No.: US 7,889,813 B2
(45) Date of Patent: Feb. 15, 2011

(54) METHOD, APPARATUS AND RECEIVER FOR DEMAPPING DUAL CARRIER MODULATED COFDM SIGNALS

(75) Inventors: Zhongjun Wang, Singapore (SG); Lee Guek Yeo, Singapore (SG); Yanxin Yan, Singapore (SG); Masayuki Tomisawa, Singapore (SG); Yujing Ting, Singapore (SG); Wenzhen Li, Singapore (SG)

(73) Assignee: Oki Techno Center (Singapore) Pte Ltd., Samsung Hub (SG)

( * ) Notice: Subject to any disclaimer, the term of this patent is extended or adjusted under 35 U.S.C. 154(b) by 1097 days.

(21) Appl. No.: 11/638,707

(22) Filed: Dec. 14, 2006

(65) Prior Publication Data

US 2007/0189156 A1 Aug. 16, 2007

(30) Foreign Application Priority Data

Dec. 14, 2005 (SG) .............................. 200508067-6

(51) Int. Cl.
H03K 5/159 (2006.01)
H04L 27/00 (2006.01)
H04B 7/208 (2006.01)
H03D 3/00 (2006.01)

(52) U.S. Cl. ...................... 375/316; 375/229; 375/324; 370/319; 370/295; 455/702; 455/703; 329/315

(58) Field of Classification Search ......... 375/229–236, 375/316, 324; 370/319, 344, 295; 455/702–703
See application file for complete search history.

(56) References Cited

U.S. PATENT DOCUMENTS

| | | | |
|---|---|---|---|
| 6,034,564 A * | 3/2000 | Iwamatsu | 329/306 |
| 7,313,750 B1 * | 12/2007 | Feng et al. | 714/796 |
| 7,512,185 B2 * | 3/2009 | Sharon et al. | 375/260 |
| 7,590,188 B2 * | 9/2009 | Giannakis et al. | 375/295 |
| 2001/0033600 A1 * | 10/2001 | Yang et al. | 375/130 |
| 2002/0037058 A1 * | 3/2002 | Birru | 375/340 |
| 2002/0110109 A1 * | 8/2002 | Kawaguchi et al. | 370/342 |
| 2002/0131515 A1 * | 9/2002 | Rodriguez | 375/262 |
| 2002/0183007 A1 * | 12/2002 | Hoshino | 455/65 |
| 2003/0128751 A1 | 7/2003 | Vandenameele-Lepla | |

FOREIGN PATENT DOCUMENTS

| | | |
|---|---|---|
| GB | 2 326 070 | 12/1998 |
| WO | WO-2004/051914 A1 | 6/2004 |

* cited by examiner

*Primary Examiner*—David C Payne
*Assistant Examiner*—Linda Wong
(74) *Attorney, Agent, or Firm*—Venable LLP; Michael A. Satori; Yao Wang

(57) ABSTRACT

A method for demapping dual carrier modulated COFDM signals comprises normalizing an estimated channel state information signal to obtain a normalized channel state information signal, determining a Y-domain weighting factor from the normalized channel state information signal, determining an X-domain weighting factor from the normalized channel state information signal, performing equalization on a received data OFDM signal to obtain an equalized data signal, weighting an equalized data signal using the Y-domain weighting factor and the X-domain weighting factor to generate a weighted input signal of a demapper and performing linear demapping of the weighted input signal in the demapper. There is also disclosed an apparatus for demapping dual carrier modulated COFDM signals and a receiver comprising such an apparatus.

11 Claims, 5 Drawing Sheets

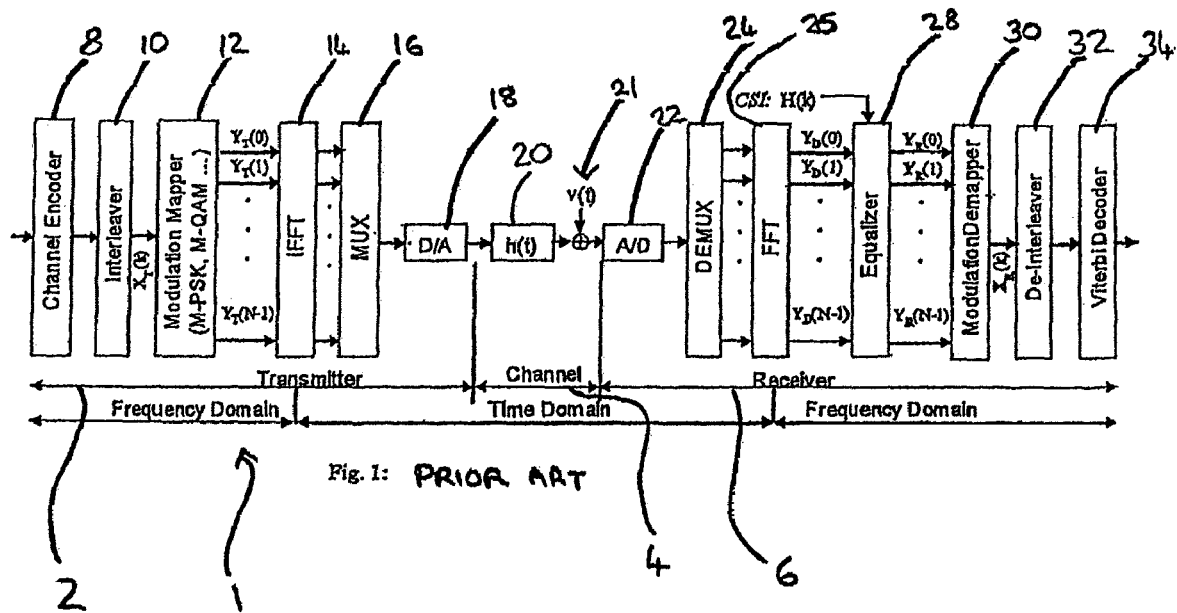
Fig. 1: PRIOR ART
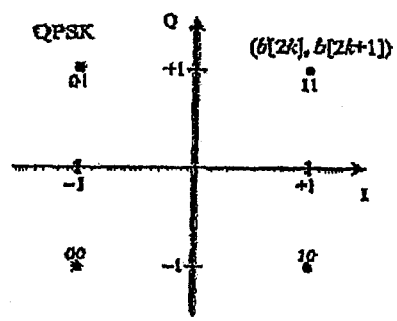
Fig. 2: PRIOR ART

METHOD, APPARATUS AND RECEIVER FOR DEMAPPING DUAL CARRIER MODULATED COFDM SIGNALS

FIELD OF THE INVENTION

The present invention relates to a method, apparatus and receiver for demapping dual carrier modulated COFDM signals in data communication systems, and more particularly to techniques for demodulating the received signals in coded orthogonal frequency-division multiplexing (COFDM) communication systems.

BACKGROUND OF THE INVENTION

Coded OFDM is a technique used in communication systems to efficiently transmit high rate signals in fading channels. Due to the wide bandwidth of these signals they would normally suffer from severe frequency selective fading. This is avoided in an OFDM system by transforming the signal into a number of orthogonal components, each of these OFDM components having a bandwidth less than the coherence bandwidth of the transmission channel. By modulating these OFDM signal components onto different subcarriers, the transmission in each individual subcarrier experiences only frequency flat fading. The Forward Error Correction (FEC) coding to transmitted information streams is thus employed to further combat the fading on OFDM subcarriers.

In a COFDM receiver system, coherent detection is necessary to provide the subsequent channel decoder (usually a Viterbi decoder) with the properly demodulated constellation signals. Coherent OFDM detection requires channel estimation and tracking. In this case, the frequency-domain estimate of transmission channel, commonly termed as Channel State Information (CSI), is often used. Although most of the related research and development has to date focused on searching for accurate and robust CSI estimation methods, the incorporation of CSI into the decoding process for enhancing the channel decoder's error correction performance has also been explored and is described in the following publications:

(1) M. R. G. Butler, S. Armour, P. N. Fletcher, A. R. Nix, and D. R. Bull, "Viterbi decoding strategies for 5 GHz wireless LAN systems," published in Proc. IEEE 54th Veh. Technol. Conf, VTC 2001 Fall, pp. 77-81.
(2) H. Sari, G. Karam, and I. Jeanclaude, "Transmission techniques for difital terrestrial TV broadcasting," published in IEEE Communications. Magzine, vol. 83, no.2, pp. 100-109, February 1995.
(3) W. Lee, H. Park, and Park J., "Viterbi decoding method using channel state information in COFDM system," published in IEEE Transactions on Consumer Electronics, vol. 45, no. 3, pp. 533-537, August 1999.

In the publication by M. R. G. Butler, S. Armour, P. N. Fletcher, A. R. Nix, and D. R. Bull, entitled "Viterbi decoding strategies for 5 GHz wireless LAN systems," published in Proc. IEEE 54th Veh. Technol. Conf, VTC 2001 Fall, pp. 77-81, this technique is referred to as "soft CSI decision decoding" and has proved to be of great value in practice when the M-PSK (M-ary phase-shift keying) modulation or M-QAM (Quadrature amplitude modulation) is used for constellation mapping.

However, in a COFDM based ultra wide-band (UWB) system such as that proposed by the WiMedia Alliance to provide very high-rate wireless transmission, in addition to QPSK (Quadrature phase-shift keying) modulation, a so-called Dual-carrier modulation (DCM) scheme was proposed for constellation mapping to achieve a degree of intra-OFDM-symbol frequency diversity. This is described, for example in the WiMedia Alliance publication of D. Leeper, "Overview of MB-OFDM," published in the website http://www.wimedia.org/, July 2005. However, in such a system, the conventional method such as that described in the publication by M. R. G. Butler, S. Armour, P. N. Fletcher, A. R. Nix, and D. R. Bull, entitled "Viterbi decoding strategies for 5 GHz wireless LAN systems," published in Proc. IEEE 54th Veh. Technol. Conf, VTC 2001 Fall, pp. 77-81 cannot be directly applied as it is tailored for single subcarrier modulation.

It is commonly known that, to achieve lower error probability, the soft-decision, instead of a hard-decision, should be used for the Viterbi decoding. It can be shown that the difference between the performance of standard soft- and hard-decision decoding is roughly 2 dB for an AWGN channel. This is described in the publication by J. G. Proakis and M. Salehi, Communication Systems Engineering. 2nd Edition, Prentice-Hall, New Jersey, 2002. However, in practice, when the fading effect is taken into consideration in a wireless OFDM system, standard soft-decision decoding performs poorly and its performance may be even much worse than that of hard-decision decoding. This is described in, for example, the publication by M. R. G. Butler, S. Armour, P. N. Fletcher, A. R. Nix, and D. R. Bull, entitled "Viterbi decoding strategies for 5 GHz wireless LAN systems," published in Proc. IEEE 54th Veh. Technol. Conf, VTC 2001 Fall, pp. 77-81. The significant performance degradation with standard soft-decision decoding may be due to the well-known noise amplifying effect of the frequency domain equalization process, that is, the noise on highly attenuated subcarriers is enhanced significantly when the received symbol magnitudes are normalized. As shown in the publication by M. R. G. Butler, S. Armour, P. N. Fletcher, A. R. Nix, and D. R. Bull, entitled "Viterbi decoding strategies for 5 GHz wireless LAN systems," published in Proc. IEEE 54th Veh. Technol. Conf, VTC 2001 Fall, pp. 77-81, this unexpected performance loss can be recovered by weighting the path metrics of Viterbi decoder using the magnitude of CSI. Or, equivalently, one may simply use the CSI, $\{H(k)\}$, to weight the complex input of the modulation demapper.

Furthermore, as is also shown in the publication by M. R. G. Butler, S. Armour, P. N. Fletcher, A. R. Nix, and D. R. Bull, entitled "Viterbi decoding strategies for 5 GHz wireless LAN systems," published in Proc. IEEE 54th Veh. Technol. Conf, VTC 2001 Fall, pp. 77-81, when the subcarriers in an OFDM system are M-PSK or M-QAM modulated, the weighting method has proved to be effective for enhancing the error correction capability of Viterbi decoder. Importantly, this implies that one constellation point is only related to a single subcarrier. In the OFDM UWB system, this is also the case for the lower rate transmission where the conventional QPSK constellation mapping/demapping is employed. However, in the case of high data rate transmission, where the DCM is involved, this method turns out to be unsuitable as one constellation point is now related to two different subcarriers.

Thus there is a need for a system and method for demapping DCM signals with improved decoding performance.

SUMMARY OF THE INVENTION

According to a first aspect of the present invention there is provided a method for demapping dual carrier modulated COFDM signals comprising:
  normalizing an estimated channel state information signal to obtain a normalized channel state information signal;
  determining a Y-domain weighting factor from the normalized channel state information signal;

determining an X-domain weighting factor from the normalized channel state information signal;

performing equalization on a received data OFDM signal to obtain an equalized data signal;

weighting an equalized data signal using the Y-domain weighting factor and the X-domain weighting factor to generate a weighted input signal of a demapper; and performing linear demapping of the weighted input signal in the demapper.

Preferably, the step of determining the Y-domain weighting factor comprises determining the Y-domain weighting factor according to the equation: $\rho(k)=\min(|\hat{H}(k)|,\sigma)$, for k=0 to N−1, where $\rho(k)$ is the Y-domain weighting factor, $|\hat{H}(k)|$ is the normalized magnitude of the channel state information signal, σ is an empirical constant and N is the number of frequency domain complex values in the received data OFDM signal.

Preferably, the step of determining the X-domain weighting factor comprises determining the X-domain weighting factor according to the equation: $\lambda(i)=\lambda(i+N/2)=\min(|\hat{H}(i)|, |\hat{H}(i+N/2)|)$, for i=0 to N/2−1 where $\lambda(i)$ is the X-domain weighting factor, $|\hat{H}(i)|$ is the normalized magnitude of the channel state information signal, and N is the number of frequency domain complex values in the received data OFDM signal.

Preferably, the step of weighting the input signal in the demapper comprises weighting the input signal according to the equation: $\hat{Y}_R(k)=Y_R(k)\cdot\rho(k)\cdot\lambda(k)$, for k=0 to N−1, where $\lambda(k)$ is the X-domain weighting factor, N is the number of frequency domain complex values in the received data OFDM signal, $\rho(k)$ is the Y-domain weighting factor, $\hat{Y}_R(k)$ is the weighted input signal of the demapper and $\hat{Y}_R(k)$ is the equalized data signal.

Preferably, the step of performing linear demapping comprises performing said step according to the equation: $X_R(i)=f(\hat{Y}_R(k),\hat{Y}_R(k+N/2))$, i∈[0,2N−1] and k∈[0,N/2−1], where $X_R(i)$ is the demapped signal, $\hat{Y}_R(k)$ is the weighted input signal of the demapper, and N is the number of frequency domain complex values in the received data OFDM signal.

According to a second aspect of the present invention there is provided an apparatus for demapping dual carrier modulated COFDM signals comprising:

a first stage arranged to normalize an estimated channel state information signal to obtain a normalized channel state information signal;

a second stage arranged to determine a Y-domain weighting factor from the normalized channel state information signal;

a third stage arranged to determine an X-domain weighting factor from the normalized channel state information signal;

an equalization stage for performing equalization on a received data OFDM signal to obtain an equalized data signal; and a demapper stage arranged to weight an equalized data signal using the Y-domain weighting factor and the X-domain weighting factor to generate a weighted input signal of a demapper; wherein the demapper is arranged to perform linear demapping of the weighted input signal of the demapper.

In a preferred embodiment, the second stage is arranged to determine the Y-domain weighting factor according to the equation: $\rho(k)=\min(|\hat{H}(k)|,\sigma)$, for k=0 to N−1, where $\rho(k)$ is the Y-domain weighting factor, $|\hat{H}(k)|$ is the normalized magnitude of channel state information signal, σ is an empirical constant and N is the number of frequency domain complex values in the received data OFDM signal.

Preferably, the third stage is arranged to determine the X-domain weighting factor according to the equation: $\lambda(i)=\lambda(i+N/2)=\min(|\hat{H}(i)|,|\hat{H}(i+N/2)|)$, for i=0 to N/2−1 where $\lambda(i)$ is the X-domain weighting factor, $|\hat{H}(i)|$ is the normalized magnitude of channel state information signal, and N is the number of frequency domain complex values in the received data OFDM signal.

Preferably, the demapper stage is arranged to weight the input signal in the demapper according to the equation: $\hat{Y}_R(k)=Y_R(k)\cdot\rho(k)\cdot\lambda(k)$, for k=0 to N−1, where $\lambda(k)$ is the X-domain weighting factor, N is the number of frequency domain complex values in the received data OFDM signal, $\rho(k)$ is the Y-domain weighting factor, $\hat{Y}_R(k)$ is the weighted input signal of the demapper and $Y_R(k)$ is the equalized data signal.

Preferably, the demapper stage is arranged to perform linear demapping according to the equation: $X_R(i)=f(\hat{Y}_R(k),\hat{Y}_R(k+N/2))$, i∈[0,2N−1] and k∈[0,N/2−1], where $X_R(i)$ is the demapped signal, $\hat{Y}_R(k)$ is the weighted signal, and N is the number of frequency domain complex values in the received data OFDM signal.

According to a third aspect of the present invention there is provided a receiver for demapping dual carrier modulated COFDM signals comprising the apparatus defined above.

Thus, one or more preferred embodiments provide a CSI-aided scheme for soft-decision demapping of dual-carrier modulated COFDM signals.

BRIEF DESCRIPTION OF THE DRAWINGS

Preferred embodiments of the present invention will now be described by way of example and with reference to the drawings in which:

FIG. 1 is a block schematic of a conventional COFDM baseband system;

FIG. 2 is an Argand diagram of QPSK constellation bit encoding;

DETAILED DESCRIPTION OF PREFERRED EMBODIMENTS

Figure 3A:
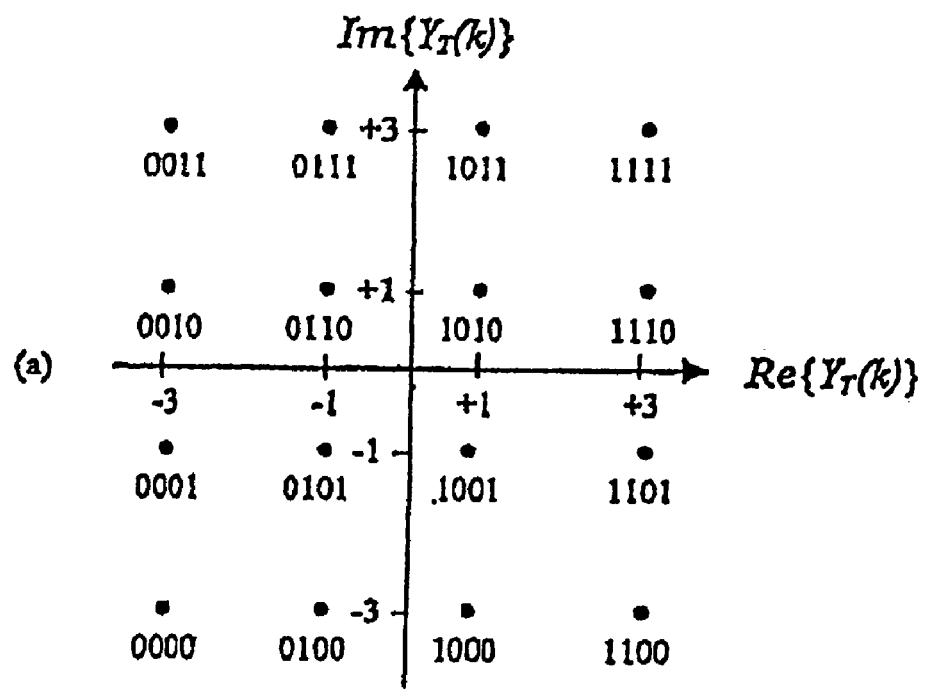
FIG. 3(a) is an Argand diagram showing a first DCM constellation mapping.

A conventional COFDM baseband communication channel system 1 is depicted in FIG. 1. The system 1 comprises three parts, a transmitter section 2, a communication channel 4, and a receiver section 6. The transmitter section 2 comprises a channel encoder 8 for receiving an input signal. The output of the channel encoder 8 is connected to the input of an interleaver stage 10. The output of the interleaver stage 10 is connected to the input of a modulation mapper 12, the digital outputs of which are applied to the inputs of an Inverse Fast Fourier Transform (IFFT) stage 14. The outputs of the IFFT stage 14 are applied to a multiplexer stage 16. The output of the multiplexer is connected to the input of a digital to analog converter stage 18, the output of which is sent to the communication channel 4.

The communication channel 4 is modeled as a multipath fading channel with channel impulse response, h(t) 20, and corrupted by an additive noise 21. At the receiver stage 6, the analog signal received from the communication channel 4 is converted to digital signal by an analog to digital converter 22. The output of the analog to digital converter 22 is applied to the input of a demultiplexer stage 24, the outputs from which are applied to the inputs of a Fast Fourier Transform (FFT) stage 26. The outputs of the FFT stage 26 are applied to an equalizer stage 28. The output of the equalizer stage 26 is connected to the input of a modulation demapper stage 30. The output of the modulation demapper stage 30 is connected to a deinterleaver stage 32, the output of which is applied to the input of a viterbi decoder 34.

In the transmitter section 2, binary input data are encoded by the convolutional channel encoder 8. The coding rate may be adjusted by puncturing the coded output bits to accommodate the desired data rate. After bit interleaving in the interleaver stage 10, the binary values, $\{X_T(k)\}$, are mapped onto the modulation constellations in the modulation mapper stage 12. The constellation-mapped complex values, $\{Y_T(k)\}$, are then applied to the Inverse Fast Fourier Transform (IFFT) stage 14 for further OFDM modulation. Up to the Inverse Fast Fourier Transform (IFFT) stage 14, the system operates in the frequency domain however this is changed in the Inverse Fast Fourier Transform (IFFT) stage 14 to operate in the time domain.

The output signals of the IFFT stage 14 are applied to the multiplexer stage 16 where they are multiplexed and the resulting output signal is converted from digital mode to analog mode in the digital to analog converter stage 18. The analog signal is then sent to the communication channel 4 where it may be distorted by multipath channel fading 20 as well as corrupted by the channel noise 21.

In the receiver section 6, after performing the appropriate timing acquisition and frequency synchronization in the demultiplexer stage 24, a FFT is performed in the FFT stage 26 to convert each time-domain OFDM symbol into N frequency-domain complex values, $\{Y_D(k)\}$. Ideally, these complex values should be same as $\{Y_T(k)\}$, but in practice they are usually distorted by the channel as well as the residual carrier frequency offset error and/or timing drifting caused by the inaccurate system clock frequency. Thus, before being used as the input to the modulation demapper stage 30, the values, $\{Y_D(k)\}$, should be compensated so that the equalized and phase-offset-corrected values, $\{Y_R(k)\}$, are good estimates of $\{Y_T(k)\}$. The compensation is performed by using a frequency-domain estimate of the transmission channel, $\{H(k)\}$, that is, the CSI. After this coherent detection, the equalized and phase-offset-corrected values $\{Y_R(k)\}$ are demapped in the demapper stage 30 and the resultant values, $\{X_R(k)\}$, are then de-interleaved in the deinterleaver stage 32 before being decoded, preferably by a Viterbi decoder 34, to recover the transmitted information bits.

In the transmitter section 2, the subcarrier constellation mapping applied in the mapping stage 12 typically uses either M-PSK modulation or M-QAM. Both types of modulation perform single-subcarrier mapping. For description convenience and without loss of generality, here, the QPSK modulation is used as an example for further explanation. With QPSK modulation, the coded and interleaved binary serial input data, b[i] where i=0,1,2, . . . , is divided into groups of 2 bits, (b[2k],b[2k+1]), and converted into a complex number, $Y_T(k)$, according to the Gray-coded constellation mapping as shown in FIG. 2. Mathematically, the output values, $Y_T(k)$, can be obtained as $$Y_T(k) = K_{MOD} \times X_T(k) = K_{MOD} \times (1+jQ) = K_{MOD} \times \{(2 \cdot b[2k]-1)+j(2 \cdot b[2k+1]-1)\}, k=0,1,2,\ldots \quad (1)$$

where $K_{MOD} = 1/\sqrt{2}$ is the normalization factor for QPSK constellation mapping.

The output of the demapper stage in FIG. 1 may be denoted as:

$$X_R(k) = Y_R(k)/K_{MOD}, \; k=0,1,2 \ldots \quad (2)$$

In the receiver stage 6, to achieve lower error probability, the soft-decision, instead of the hard-decision, should be used for the Viterbi decoding. It may be shown that the difference between the performance of standard soft- and hard-decision decoding is roughly 2 dB for an AWGN channel. This is described, for example, in the publication by J. G. Proakis and M. Salehi, Communication Systems Engineering. 2nd Edition, Prentice-Hall, New Jersey, 2002. However, in practice, when the fading effect is taken into consideration in a wireless OFDM system, standard soft-decision decoding actually performs poorly and its performance may even be much worse than that of hard-decision decoding. This is described in the publication by M. R. G. Butler, S. Armour, P. N. Fletcher, A. R. Nix, and D. R. Bull, entitled "Viterbi decoding strategies for 5 GHz wireless LAN systems," published in Proc. IEEE 54th Veh. Technol. Conf, VTC 2001 Fall, pp. 77-81. The significant performance degradation with standard soft-decision decoding in this case is due to the noise amplifying effect of the frequency domain equalization process, that is, the noise on highly attenuated subcarriers is enhanced significantly when the received symbol magnitudes are normalized. As shown in the publication by M. R. G. Butler, S. Armour, P. N. Fletcher, A. R. Nix, and D. R. Bull, entitled "Viterbi decoding strategies for 5 GHz wireless LAN systems," published in Proc. IEEE 54th Veh. Technol. Conf, VTC 2001 Fall, pp. 77-81, this unexpected performance loss may be recovered by weighting the path metrics of the Viterbi decoder 34 using the magnitude of CSI. Or, equivalently, one may simply use the CSI, $\{H(k)\}$, to weight the complex input of the modulation demapper 30 as follows, $$\hat{Y}_R(k) = Y_R(k) |\hat{H}(k)|^2, \text{ for } k=0 \text{ to } N-1, \quad (3)$$

where $|\hat{H}(k)|$ is the normalized magnitude of H(k) on the $k^{th}$ subcarrier, and N is the number of data subcarriers contained in an OFDM symbol.

Accordingly, Equation (2) may be modified as follows:

$$X_R(k) = \hat{Y}_R(k)/K_{MOD}, \; k=0,1,2 \ldots \quad (4)$$

The explanation for Equations (3) and (4) is that when the magnitude of the CSI on subcarrier k, $|\hat{H}(k)|$ is larger, the equalized symbol value on this individual subcarrier, $Y_R(k)$, is more noise resistant and reliable, and, therefore, a larger weighting factor (that is, with high confidence) should be selected for soft-decision demapping, and vice versa.

As shown in the publication by M. R. G. Butler, S. Armour, P. N. Fletcher, A. R. Nix, and D. R. Bull, entitled "Viterbi decoding strategies for 5 GHz wireless LAN systems," published in Proc. IEEE 54th Veh. Technol. Conf, VTC 2001 Fall, pp. 77-81, when the subcarriers in an OFDM system are M-PSK or M-QAM modulated, the weighting method given in Equation (3) has proved to be effective for enhancing the error correction capability of Viterbi decoder. Importantly, the application of Equation (3) implies that one constellation point is only related to a single subcarrier. In the OFDM UWB system, this is also the case for the lower rate transmission where the conventional QPSK constellation mapping/demapping is employed. However, in the case of high data rate transmission, where the DCM is involved, this method turns out to be unsuitable since one constellation point is now related to two different subcarriers.

As described in the WiMedia Alliance publication of D. Leeper, "Overview of MB-OFDM," published in the website http://www.wimedia.org/, July 2005, to provide intra-OFDM-symbol frequency diversity, the DCM modulation technique divides the coded and interleaved binary serial input data, b[i], where i=0,1,2, . . . , into groups of 2N bits and converts them into N complex symbol values. The conversion consists of two procedures. Firstly, the 2N coded and interleaved bits are grouped into N/2 groups of 4 bits. Each group is represented as (b[g(k)], b[g(k)+1], b[g(k)+N/2], b[g(k)+N/2+1]), where k∈[0, N/2−1] and $$g(k) = \begin{cases} 2k & k \in [0, N/4-1] \\ 2k + N/2 & k \in [N/4, N/2-1] \end{cases} \quad (5)$$

Figure 3B:
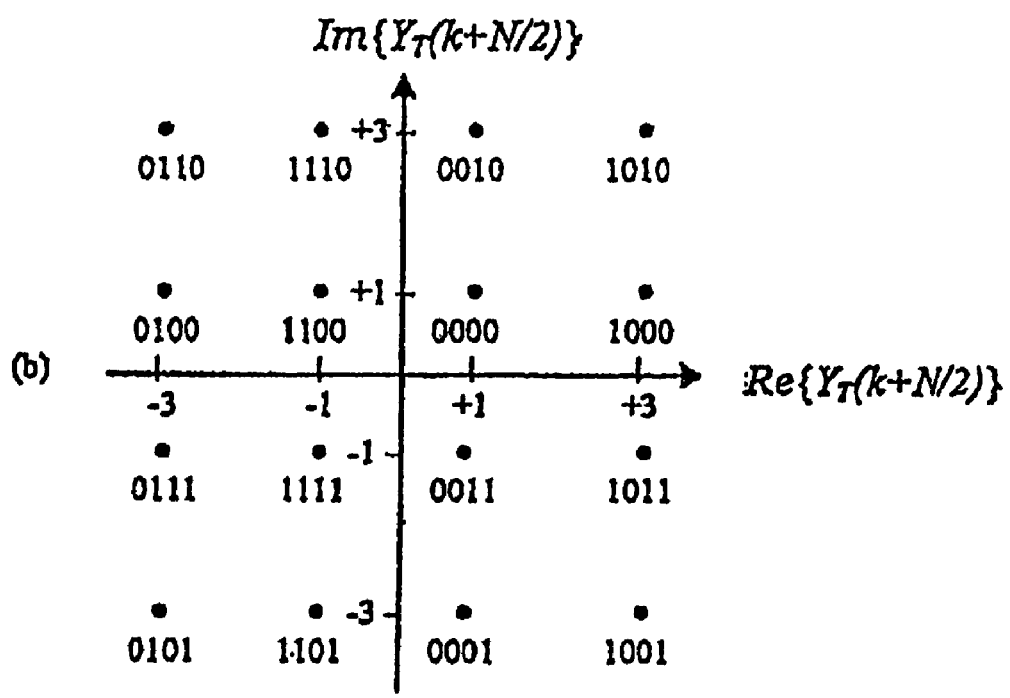
FIG. 3(b) is an Argand diagram showing a second DCM constellation mapping.

Next, each group of 4 bits (b[g(k)], b[g(k)+1], b[g(k)+N/2], b[g(k)+N/2+1]) is mapped onto a four-dimensional constellation, as shown in FIGS. 3a and 3b, and converted into two complex numbers $\{Y_T(k), Y_T(k+N/2)\}$. After applying a normalization factor, $K_{MOD}=1/\sqrt{10}$ the block of complex symbols $\{Y_T(k)\}$ then forms the input to the OFDM modulation block as shown in FIG. 1. Referring to FIG. 1, if $X_T(i)=2\cdot b[i]-1$ (that is, he interleaved bit values $b[i] \in \{0,1\}$ are mapped into bipolar symbols $X_T(i) \in \{-1,1\}$), the DCM constellation mapping shown in FIGS. 3a and 3b may actually be obtained by mapping the bipolar symbols $X_T(i)$ to complex symbols $Y_T(k)$ as $$\begin{bmatrix} Y_T\left(n + \frac{mN}{4}\right) \\ Y_T\left(n + \frac{mN}{4} + \frac{N}{2}\right) \end{bmatrix} = \quad (6)$$

$$\frac{1}{\sqrt{10}} \begin{bmatrix} 2 & 1 \\ 1 & -2 \end{bmatrix} \begin{bmatrix} X_T(2n+mN) + jX_T\left(2n+mN+\frac{N}{2}\right) \\ X_T(2n+mN+1) + jX_T\left(2n+mN+\frac{N}{2}+1\right) \end{bmatrix},$$

for n=0 to N/4−1 and m=0 to 1. Correspondingly, the DCM demapping at the receiver end may be performed as $$\begin{bmatrix} X_R(2n+mN) + jX_R\left(2n+mN+\frac{N}{2}\right) \\ X_R(2n+mN+1) + jX_R\left(2n+mN+\frac{N}{2}+1\right) \end{bmatrix} = \quad (7)$$

$$\frac{\sqrt{10}}{5} \begin{bmatrix} \text{Re}\{U\} + j\text{Im}\{U\} \\ \text{Re}\{V\} + j\text{Im}\{V\} \end{bmatrix},$$

where $U=2\hat{Y}_R(n+mN/4)+\hat{Y}_R(n+mN/4+N/2)$ and $V=\hat{Y}_R(n+mN/4)-2\hat{Y}_R(n+mN/4+N/2)$, for n=0 to N/4−1 and m=0 to 1.

For description convenience, Equation (7) can be equivalently represented in a compact form as $$X_R(i)=f(\hat{Y}_R(k), \hat{Y}_R(k+N/2)), i \in [0, 2N-1] \text{ and } k \in [0, N/2-1], \quad (8)$$

where the system-defined demapping function f(·) is linear as can be seen from Equation (7).

It can be seen from Equation (6) and FIGS. 3a and 3b that the real and imaginary parts of $\{Y_T(k)\}$ are valued at $1/\sqrt{10}, -1/\sqrt{10}, 3/\sqrt{10},$ or $-3/\sqrt{10}$ (with $K_{MOD}$). As a result, the DCM constellation demapping at the receiver end is sensitive to the magnitude variation of the real or imaginary part of $Y_R(k)$. This is different from QPSK. Moreover, although the constellation mapping shown in FIGS. 3a and 3b looks similar to that of a 16-QAM modulation, in fact the two modulation systems differ as, in the case of DCM, each demapped value, $X_R(i)$, is found to be related not to a single subcarrier (as is the case in 16-QAM) but to two different subcarriers, that is, as a function of $\hat{Y}_R(k)$ and $\hat{Y}_R(k+N/2)$.

To obtain $\hat{Y}_R(k)$ and $\hat{Y}_R(k+N/2)$, one cannot directly follow Equation (3) to weight $\hat{Y}_R(k)$ by $|\hat{H}(k)|$ and $Y_R(k+N/2)$ by $|\hat{H}(k+N/2)|$ independently. If, for example, one of $|\hat{H}(k)|$ and $|\hat{H}(k+N/2)|$ is large and the other is very small (such as is the case if deep fading exists on that subcarrier), the direct use of Equation (3) may not only change the magnitude of the demapped value, $X_R(i)$, but may also mistakenly reverse its sign. This, of course, is not desirable for the following soft decision decoding in this case.

According to one or more preferred embodiments, this issue is further investigated and a technique for demapping the DCM signals with improved decoding performance has been developed.

Based on the above observations, a method for weighting the input of DCM demapper according to a preferred embodiment of the invention is proposed as follows:

$$\hat{Y}_R(k)=Y_R(k)\cdot\rho(k)\cdot\lambda(k), \text{ for } k=0 \text{ to } N-1 \quad (9)$$

Here, $\rho(k)=\min(|\hat{H}(k)|, \sigma)$, (σ is an empirical constant and can be determined through actual design practice); and, $\lambda(i)=\lambda(i+N/2)=\min(|\hat{H}(i)|, (|\hat{H}(i+N/2)|)$ for i=0 to N/2−1. (min(x, y) means the smaller one of x and y). The idea is to first apply the "Y-domain" weighting, ρ(k), to a limited extent and then apply the "X-domain" weighting, λ(i), to counteract the high degree of noise on deeply faded subcarriers. By using this two-dimensional tuning, better soft-decision decoding performance may be achieved.

To explain further and examine the effectiveness of the method according to a preferred embodiment of the invention, the following three typical scenarios may be considered:

Case I—Both $|\hat{H}(k)|$ and $|\hat{H}(k+N/2)|$ are very small. Without loss of generality, $|\hat{H}(k)|<|\hat{H}(k+N/2)|$ is assumed. Following Equation (9), in this case, the weighting factors on $Y_R(k)$ and $Y_R(k+N/2)$ become, $|\hat{H}(k)|^2$ and $|\hat{H}(k)|\cdot|\hat{H}(k+N/2)|$ respectively. As the difference between these two weighting factors is within a small range, that is, $|\hat{H}(k)|^2 \approx |\hat{H}(k)|\cdot|\hat{H}(k+N/2)|$, the two-dimensional tuning converges to one-dimensional weighting. Similar to that in Equation (3), improved soft decision demapping is thus expected.

Case II—Both $|\hat{H}(k)|$ and $\hat{H}(k+N/2)$ are large. Without loss of generality, $|\hat{H}(k)|<|\hat{H}(k+N/2)|$ is assumed. In this case, the weighting factors on $Y_R(k)$ and $Y_R(k+N/2)$ are found to be same—$\sigma|\hat{H}(k)|$. Again, the two-dimensional tuning converges to one-dimensional weighting and improved CSI-aided soft decision demapping may also be expected in this scenario.

Case III—One of $|\hat{H}(k)|$ and $|\hat{H}(k+N/2)|$ is large and the other is very small. Without loss of generality, if it is assumed that $|\hat{H}(k)|$ is very small and $|\hat{H}(k+N/2)|$ is large. Following Equation (9), in this case, the weighting factors on $Y_R(k)$ and $Y_R(k+N/2)$ become $|\hat{H}(k)|^2$ and $\sigma|\hat{H}(k)|$ respectively and $$|\hat{H}(k)|^2 < \sigma|\hat{H}(k)| < |\hat{H}(k)| \cdot |\hat{H}(k+N/2)| < |\hat{H}(k+N/2)|^2 \quad (10)$$

The selection of the weighting factor on $Y_R(k+N/2)$ to be greater than $|\hat{H}(k)|^2$ has taken advantage of the fact that the subcarrier K+N/2 is of higher reliability in this case. Meanwhile, the selection of the weighting factor to be less than $|\hat{H}(k+N/2)|^2$ and even less than $|\hat{H}(k)| \cdot |\hat{H}(k+N/2)|$ limits the difference between the two weighting factors to an acceptable range thereby the aforementioned undesirable sign reversion of the demapped value may be prevented. As a result, a balanced weighting on two subcarriers may be achieved with a good compromise between maintaining the signal integrity and suppressing the noise. This is helpful for a soft decision channel decoder to achieve good decoding performance.

Figure 4:
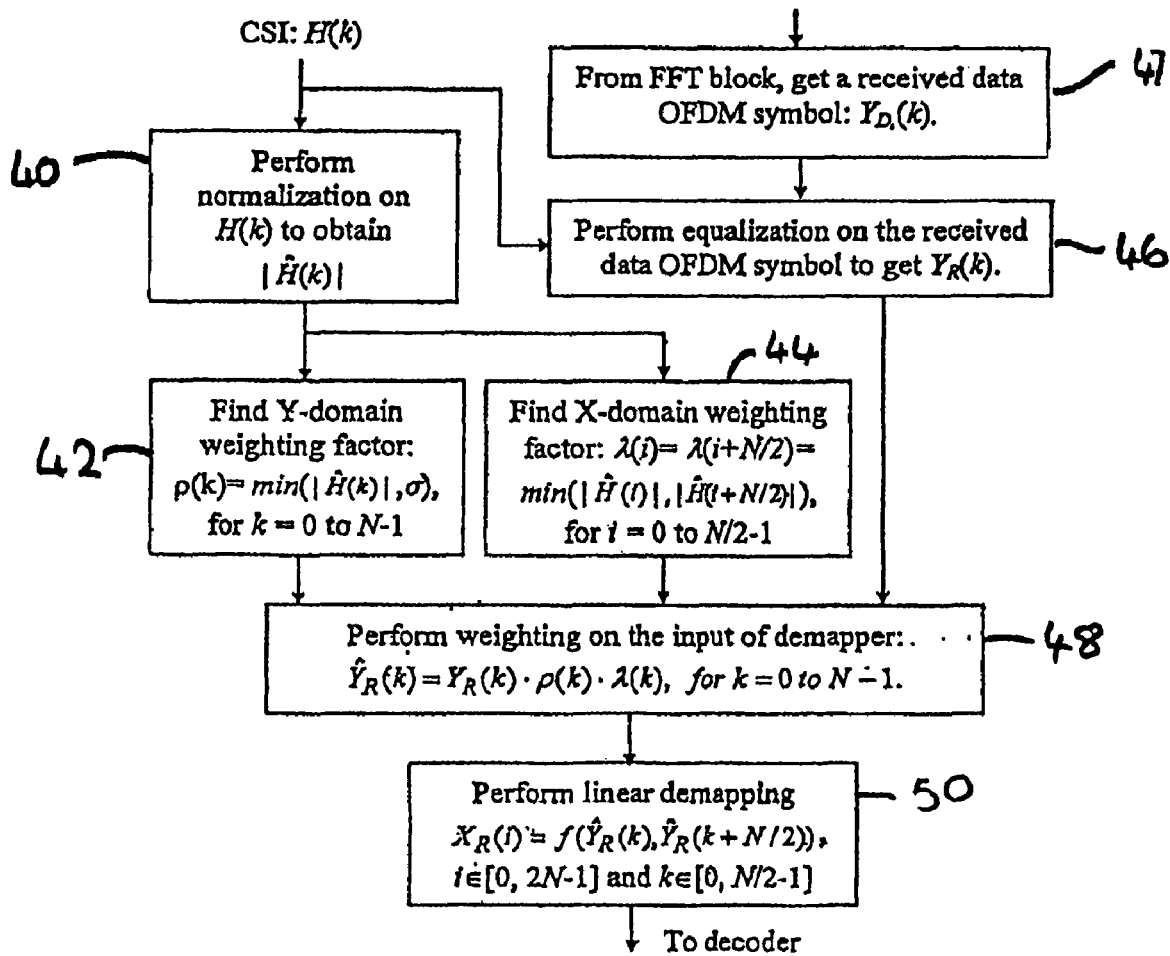
FIG. 4 is a schematic flow diagram showing a method for demapping dual carrier modulated COFDM signals according to a preferred embodiment of the invention.

Following the above description, FIG. 4 shows a schematic flow diagram of a method for demapping dual carrier modulated OFDM signals according to a preferred embodiment of the invention for use in a receiver section of an OFDM system such as that shown in FIG. 1. The method includes the following steps:

(1) In a first stage 40, normalization is performed on the estimated channel state information H(k) to obtain $|\hat{H}(k)|$, k=0 to N−1.

(2) In a second stage 42, determining the Y-domain weighting factor: $\rho(k)=\min(|\hat{H}(k)|, \sigma)$, for k=0 to N−1.

(3) In a third stage 44, determining the X-domain weighting factor $\lambda(i)=\lambda(i+N/2)=\min(|\hat{H}(i)|,|\hat{H}(i+N/2)|)$, for i=0 to N/2−1.

(4) In a fourth stage 46, performing equalization on the received data OFDM symbol, $Y_D(k)$, to obtain $Y_R(k)$, where $Y_D(k)$ is a received data OFDM symbol from an FFT block 47 and k=0 to N−1.

(5) In a fifth stage 48, using the Y-domain weighting factor obtained in Step 2 and the X-domain weighting factor obtained in Step 3 to weight the input of a demapper as, $\hat{Y}_R(k)=Y_R(k) \cdot \rho(k) \cdot \lambda(k)$, for k=0 to N−1.

(6) In a sixth stage 50, using $\hat{Y}_R(k)$, to perform linear demapping as, $X_R(i)=f(\hat{Y}_R(k),\hat{Y}_R(k+N/2))$, i∈[0,2N−1] and k∈[0, N/2−1].

The linear function $f(\cdot)$ follows Equation (8).

The above method according to a preferred embodiment of the present invention has been applied to an OFDM UWB baseband system (not shown) for verification. In this case, the DCM technique is used for three higher data rate transmissions (320, 400 and 480 Mb/s). The simulation settings including the channel environments are generally similar to those given in the publication by IEEE P802.15-03/268r2, "Multi-band OFDM Physical Layer Proposal for IEEE 802.15 Task Group 3a," Nov. 10, 2003. For convenience of comparison, in the following experiment, perfect timing synchronization and carrier and clock frequency offset estimation are also assumed.

Figure 5A:
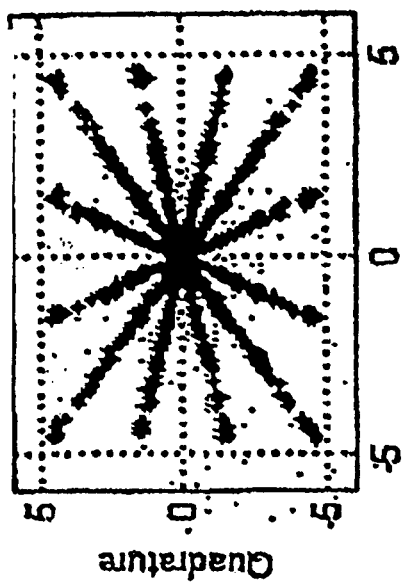
FIG. 5(a) is a scatterplot of coherently detected constellation points before CSI-aided demapping with a high SNR.
Figure 5:
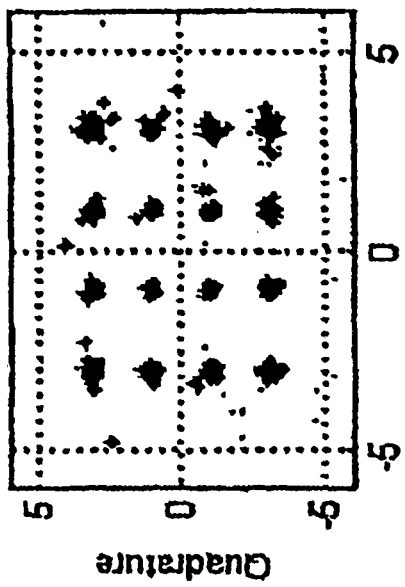
FIG. 5(b) is a scatterplot of coherently detected constellation points after CSI-aided demapping with a high SNR.
FIG. 5(c) is a scatterplot of coherently detected constellation points before CSI-aided demapping with an operational SNR.
FIG. 5(d) is a scatterplot of coherently detected constellation points after CSI-aided demapping with an operational SNR.
Figure 5:
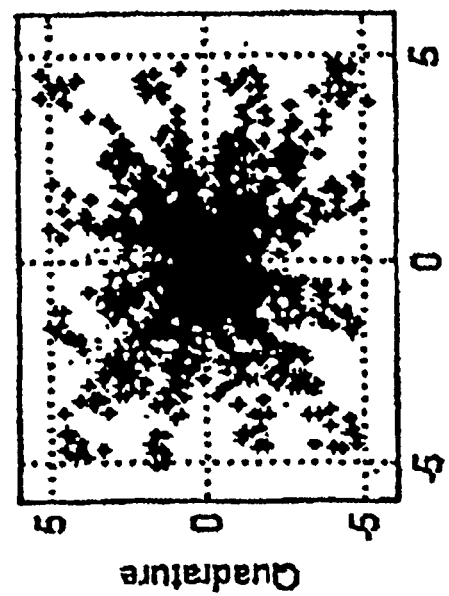
Figure 5:
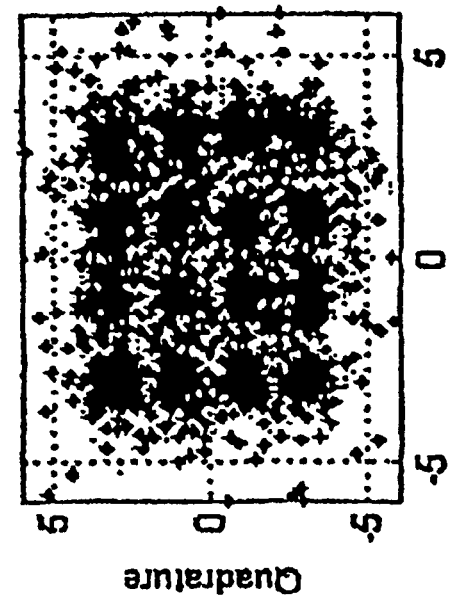

In the experiment, the constellation variations under no-CSI and CSI-aided demapping and different SNR's are demonstrated. When the channel signal-to-noise ratio (SNR) is very high, the equalized outputs, $Y_R(k)$, are typically presented in a format as illustrated in FIG. 5(a). This scatter-plot may be expected from FIGS. 3a and 3b as, in the case of FIG. 5(a), the noise amplifying effect is negligible. The corresponding scatter-plot of $\hat{Y}_R(k)$, which is obtained by exercising Equation (9) on $Y_R(k)$, is shown in FIG. 5(b). From FIG. 5(b), it will be seen that the CSI weighting effect has been clearly observed. In this high-SNR case, instead of obtaining, $\hat{Y}_R(k)$ using Equation (9), an alternative way is to directly apply a hard-decision on $Y_R(k)$ such that $\hat{Y}_R(k)$ are valued at $\{1/\sqrt{10},-1/\sqrt{10},3/\sqrt{10}, \text{ or } -3/\sqrt{10}\}$).

Figure 6:
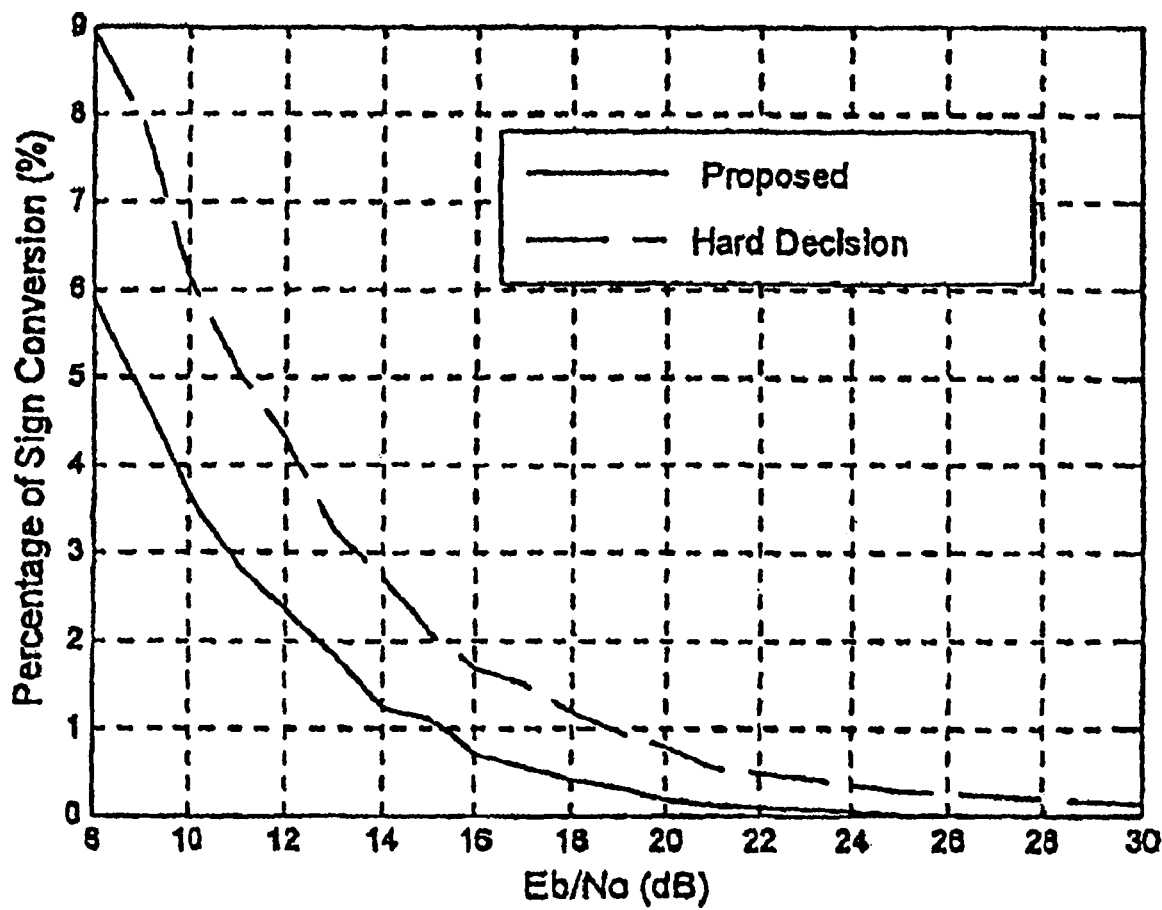
FIG. 6 is a graph comparing the performance (that is the percentage of unexpected polarity reversion) against the SNR of a system according to a preferred embodiment of the present invention and a conventional hard decision system in a CM1 environment at data rate of 480 Mb/s.

In both cases, after applying $\hat{Y}_R(k)$ to Equation (7), the resulting soft decision demapped symbol values, $X_R(i)$, are used as the input of a Viterbi decoder which leads to similar system performance in both cases. However, when the SNR is lower such that the system performance degradation caused by a noise amplifying effect can no longer be ignored, the CSI-aided demapping according to a preferred embodiment of the invention is advantageous over the a hard-decision technique without CSI demapping. FIGS. 5(c) and 5(d) illustrate the scatter-plots of $Y_R(k)$ and $\hat{Y}_R(k)$ under a low SNR situation. In this case, as the constellation points in FIG. 5(c) disperse to a greater extent, the simple hard-decision on the noisy equalized output $Y_R(k)$ will more likely cause unexpected polarity reversion on the demapped symbol values than the CSI-aided technique according to a preferred embodiment of the invention. To verify this, simulations have been carried out to compare the percentages of unexpected polarity reversion on $X_R(i)$ against different SNR's in both cases. The statistical results are shown in FIG. 6. It can be seen that the technique according to a preferred embodiment of the present invention consistently leads to a lower occurrence of incorrect sign reversion on the demapped values than the simple hard-decision technique.

Various modifications to the embodiments of the present invention described above may be made. For example, other components and method steps can be added or substituted for those above. Thus, although the invention has been described above using particular embodiments, many variations are possible within the scope of the claims, as will be clear to the skilled reader, without departing from the scope of the invention.

The invention claimed is:

1. A method for demapping dual carrier modulated (DCM) coded orthogonal frequency-division multiplexing (COFDM) signals comprising:
    performing equalization on a received dual carrier modulated COFDM signal to obtain an equalized data signal;
    normalizing an estimated frequency domain channel state information signal to obtain a normalized channel state information signal;
    determining a Y-domain weighting factor from the normalized channel state information signal;
    determining an X-domain weighting factor from the normalized channel state information signal on the dual carriers;
    weighting the equalized data signal using the Y-domain weighting factor and the X-domain weighting factor to generate a weighted input signal of a DCM demapper; and
    performing linear demapping of the weighted input signal in the frequency domain in the DCM demapper;
    wherein the step of determining the X-domain weighting factor comprises determining the X-domain weighting factor according to the equation: $\lambda(i)=\lambda(i+N/2)=\min(|\hat{H}(i)|,|\hat{H}(i+N/2)|)$, for i=0 to N/2−1, where $\lambda(i)$ is the X-domain weighting factor, $|\hat{H}(i)|$ is the normalized magnitude of channel state information signal on the i$^{th}$ subcarrier, $|\hat{H}(i+N/2)|$ is the normalized magnitude of channel state information signal on the (i+N/2)$^{th}$ subcarrier, and N is the number of frequency domain complex values in the received dual carrier modulated COFDM signal.

2. A method according to claim 1, wherein the step of determining the Y-domain weighting factor comprises determining the Y-domain weighting factor according to the equation: $\rho(k)=\min(|\hat{H}(k)|,\sigma)$, for k=0 to N−1, where $\rho(k)$ is the Y-domain weighting factor, $|\hat{H}(k)|$ is the normalized magnitude of channel state information signal on the k$^{th}$ subcarrier, σ is an empirical constant and N is the number of frequency domain complex values in the received dual carrier modulated COFDM signal.

3. A method according to claim 1, wherein the step of weighting the input signal in the DCM demapper comprises weighting the input signal according to the equation: $\hat{Y}_R(k)=Y_R(k)\cdot\rho(k)\cdot\lambda(k)$, for k=0 to N−1, where $\lambda(k)$ is the X-domain weighting factor, N is the number of frequency domain complex values in the received dual carrier modulated COFDM signal, $\rho(k)$ is the Y-domain weighting factor, $\hat{Y}_R(k)$ is the weighted input signal of the DCM demapper and $Y_R(k)$ is the equalized data signal.

4. A method according to claim 1, wherein the step of performing linear demapping comprises performing said step according to the equation: $X_R(i)=f(\hat{Y}_R(k),\hat{Y}_R(k+N/2))$, i∈[0, 2N−1] and k∈[0,N/2−1], where $X_R(i)$ is the demapped signal, $\hat{Y}_R(k)$ is the weighted input signal of the DCM demapper, N is the number of frequency domain complex values in the received dual carrier modulated COFDM signal, and $f(\cdot)$ is the system-defined linear demapping function.

5. An apparatus for demapping dual carrier modulated COFDM signals comprising:
an equalization stage for performing equalization on a received dual carrier modulated COFDM signal to obtain an equalized data signal;
a first stage arranged to normalize an estimated frequency domain channel state information signal to obtain a normalized channel state information signal;
a second stage arranged to determine a Y-domain weighting factor from the normalized channel state information signal;
a third stage arranged to determine an X-domain weighting factor from the normalized channel state information signal on the dual carriers; and
a demapper stage arranged to weight the equalized data signal using the Y-domain weighting factor and the X-domain weighting factor to generate a weighted input signal of a DCM demapper; wherein the DCM demapper is arranged to perform linear demapping of the weighted input signal of the DCM demapper in the frequency domain;
wherein the third stage is arranged to determine the X-domain weighting factor according to the equation: $\lambda(i)=\lambda(i+N/2)=\min(|\hat{H}(i)|,|\hat{H}(i+N/2)|)$, for i=0 to N/2−1, where $\lambda(i)$ is the X-domain weighting factor, $|\hat{H}(i)|$ is the normalized magnitude of channel state information signal on the $i^{th}$ subcarrier, $|\hat{H}(i+N/2)$ is the normalized magnitude of channel state information signal on the $(i+N/2)^{th}$ subcarrier, and N is the number of frequency domain complex values in the received dual carrier modulated COFDM signal.

6. An apparatus according to claim 5, wherein the second stage is arranged to determine the Y-domain weighting factor according to the equation: $\rho(k)=\min(|\hat{H}(k)|,\sigma)$, for k=0 to N−1, where $\rho(k)$ is the Y-domain weighting factor, $|\hat{H}(k)|$ is the normalized magnitude of channel state information signal on the $k^{th}$ subcarrier, σ is an empirical constant and N is the number of frequency domain complex values in the received dual carrier modulated COFDM signal.

7. An apparatus according to claim 5, wherein the demapper stage is arranged to weight the input signal in the DCM demapper according to the equation: $\hat{Y}_R(k)=Y_R(k)\cdot\rho(k)\cdot\lambda(k)$, for k=0 to N−1, where $\lambda(k)$ is the X-domain weighting factor, N is the number of frequency domain complex values in the received dual carrier modulated COFDM signal, $\rho(k)$ is the Y-domain weighting factor, $\hat{Y}_R(k)$ is the weighted signal and $Y_R(k)$ is the equalized data signal.

8. An apparatus according to claim 5, wherein the DCM demapper is arranged to perform linear demapping according to the equation: $X_R(i)=f(\hat{Y}_R(k),\hat{Y}_R(k+N/2))$, i∈[0,2N−1] and k∈[0, N/2−1], where $X_R(i)$ is the demapped signal, $\hat{Y}_R(k)$ is the weighted input signal of the DCM demapper, N is the number of frequency domain complex values in the received dual carrier modulated COFDM signal, and $f(\cdot)$ is the system-defined linear demapping function.

9. A receiver for demapping dual carrier modulated COFDM signals comprising the apparatus of claim 5.

10. A method for demapping dual carrier modulated (DCM) coded orthogonal frequency-division multiplexing (COFDM) signals comprising:
performing equalization on a received dual carrier modulated COFDM signal to obtain an equalized data signal;
normalizing an estimated frequency domain channel state information signal to obtain a normalized channel state information signal;
determining a Y-domain weighting factor from the normalized channel state information signal;
determining an X-domain weighting factor from the normalized channel state information signal on the dual carriers;
weighting the equalized data signal using the Y-domain weighting factor and the X-domain weighting factor to generate a weighted input signal of a DCM demapper; and
performing linear demapping of the weighted input signal in the frequency domain in the DCM demapper;
wherein the step of determining the Y-domain weighting factor comprises determining the Y-domain weighting factor according to the equation: $\rho(k)=\min(|\hat{H}(k)|,\sigma)$, for k=0 to N−1, where $\rho(k)$ is the Y-domain weighting factor, $|\hat{H}(k)|$ is the normalized magnitude of channel state information signal on the $k^{th}$ subcarrier, σ is an empirical constant and N is the number of frequency domain complex values in the received dual carrier modulated COFDM signal.

11. An apparatus for demapping dual carrier modulated COFDM signals comprising:
an equalization stage for performing equalization on a received dual carrier modulated COFDM signal to obtain an equalized data signal;
a first stage arranged to normalize an estimated frequency domain channel state information signal to obtain a normalized channel state information signal;
a second stage arranged to determine a Y-domain weighting factor from the normalized channel state information signal;
a third stage arranged to determine an X-domain weighting factor from the normalized channel state information signal on the dual carriers; and
a demapper stage arranged to weight the equalized data signal using the Y-domain weighting factor and the X-domain weighting factor to generate a weighted input signal of a DCM demapper; wherein the DCM demapper is arranged to perform linear demapping of the weighted input signal of the DCM demapper in the frequency domain; and
wherein the second stage is arranged to determine the Y-domain weighting factor according to the equation: $\rho(k)=\min(|\hat{H}(k)|,\sigma)$, for k=0 to N−1, where $\rho(k)$ is the Y-domain weighting factor, $|\hat{H}(k)|$ is the normalized magnitude of channel state information signal on the $k^{th}$ subcarrier, σ is an empirical constant and N is the number of frequency domain complex values in the received dual carrier modulated COFDM signal.

* * * * *

UNITED STATES PATENT AND TRADEMARK OFFICE
CERTIFICATE OF CORRECTION

PATENT NO. : 7,889,813 B2 Page 1 of 1
APPLICATION NO. : 11/638707
DATED : February 15, 2011
INVENTOR(S) : Zhongjun Wang et al.

It is certified that error appears in the above-identified patent and that said Letters Patent is hereby corrected as shown below:

On the title page of the patent,

In (73) Assignee "Oki Techno Center (Singapore) Pte Ltd., Samsung Hub (SG)" should be changed to -- Oki Techno Centre (Singapore) Pte Ltd., Singapore (SG) --

Signed and Sealed this
Fourteenth Day of June, 2011

David J. Kappos
*Director of the United States Patent and Trademark Office*